(12) United States Patent
Engelko et al.

(10) Patent No.: US 11,086,941 B2
(45) Date of Patent: Aug. 10, 2021

(54) GENERATING SUGGESTIONS FOR EXTENDING DOCUMENTS

(71) Applicant: SAP SE, Walldorf (DE)

(72) Inventors: Andrey Engelko, Bad Schoenborn (DE); Abdullah Amer, Heidelberg (DE)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 15/377,208

(22) Filed: Dec. 13, 2016

(65) Prior Publication Data

US 2018/0165362 A1  Jun. 14, 2018

(51) Int. Cl.
*G06F 16/93* (2019.01)
*G06F 16/35* (2019.01)
*G06F 16/36* (2019.01)

(52) U.S. Cl.
CPC .............. *G06F 16/93* (2019.01); *G06F 16/35* (2019.01); *G06F 16/36* (2019.01)

(58) Field of Classification Search
CPC ........... G06F 16/93; G06F 16/35; G06F 16/36
See application file for complete search history.

(56) References Cited

U.S. PATENT DOCUMENTS

| | | | |
|---|---|---|---|
| 7,401,064 B1 * | 7/2008 | Arone | G06F 16/25 |
| 8,412,739 B2 | 4/2013 | Engelko et al. | |
| 8,479,187 B2 | 7/2013 | Driesen et al. | |
| 8,527,471 B2 | 9/2013 | Hoprich et al. | |
| 8,793,230 B2 | 7/2014 | Engelko et al. | |
| 8,875,122 B2 | 10/2014 | Driesen et al. | |
| 8,924,350 B2 | 12/2014 | Hoprich et al. | |
| 9,189,226 B2 | 11/2015 | Driesen et al. | |
| 9,213,728 B2 | 12/2015 | Engelko et al. | |
| 9,471,659 B2 | 10/2016 | Driesen et al. | |
| 2001/0047372 A1 * | 11/2001 | Gorelik | G06F 16/288 715/239 |
| 2006/0136469 A1 * | 6/2006 | Dettinger | G06F 16/2471 |
| 2008/0148179 A1 * | 6/2008 | Sloo | H04N 21/4668 715/792 |
| 2009/0100089 A1 * | 4/2009 | Eadon | G06F 16/284 |
| 2009/0282062 A1 * | 11/2009 | Husic | H04L 63/0227 |
| 2010/0131523 A1 * | 5/2010 | Yu | G06Q 10/107 707/756 |

(Continued)

*Primary Examiner* — Apu M Mofiz
*Assistant Examiner* — Farhad Agharahimi
(74) *Attorney, Agent, or Firm* — Fish & Richardson P.C.

(57) ABSTRACT

The disclosure generally describes methods, software, and systems, including a method for generating suggestions for extensions to data sets. Using metadata for a plurality of documents, data relationships are determined between sets of documents of the plurality of documents. Each set of documents originates from different data sources and does not share common ontologies. The metadata includes terms and labels for documents in the plurality of documents. Using the determined data relationships, enhancement suggestions are determined. Each enhancement suggestion identifies pieces of information from at least one first document in the set of documents that can serve as an extension to information contained in a second document in the set of documents. The identified enhancement suggestions are ranked based on enhancement usability ranking factors. The ranked enhancement suggestions are provided.

20 Claims, 12 Drawing Sheets

(56) References Cited

U.S. PATENT DOCUMENTS

| | | | |
|---|---|---|---|
| 2011/0060983 A1* | 3/2011 | Cai | G06F 16/9562 |
| | | | 715/254 |
| 2011/0202526 A1* | 8/2011 | Lee | G06F 16/3344 |
| | | | 707/726 |
| 2015/0006476 A1 | 1/2015 | Engelko et al. | |
| 2016/0054898 A1* | 2/2016 | Kotler | G06F 40/12 |
| | | | 715/209 |
| 2017/0104802 A1* | 4/2017 | Chandran | H04L 67/2838 |

* cited by examiner

```
                              1100

┌─────────────────────────────────────────────────────────────────┐
│ Determine, using metadata for a plurality of documents, data     │
│ relationships between sets of documents of the plurality of      │
│ documents, each set of documents originating from different data │
│ sources and not sharing common ontologies, the metadata          │
│ including terms and labels for documents in the plurality of     │
│ documents                                                   1102 │
└─────────────────────────────────────────────────────────────────┘
                                 ↓
┌─────────────────────────────────────────────────────────────────┐
│ Identify, using the determined data relationships, enhancement   │
│ suggestions, each enhancement suggestion identifying pieces of   │
│ information from at least one first document in the set of       │
│ documents that can serve as an extension to information          │
│ contained in a second document in the set of documents      1104 │
└─────────────────────────────────────────────────────────────────┘
                                 ↓
┌─────────────────────────────────────────────────────────────────┐
│ Rank the identified enhancement suggestions based on             │
│ enhancement usability ranking factors                       1106 │
└─────────────────────────────────────────────────────────────────┘
                                 ↓
┌─────────────────────────────────────────────────────────────────┐
│ Provide the ranked enhancement suggestions                  1108 │
└─────────────────────────────────────────────────────────────────┘
```

FIG. 11

GENERATING SUGGESTIONS FOR EXTENDING DOCUMENTS

BACKGROUND

Enterprises often analyze huge amounts data from various heterogeneous data sources in order to make business decisions. Integration of information from such data sources can be a very labor intensive task that is performed mainly manually, takes a long time, and requires an expert knowledge of the underlying data models.

SUMMARY

The present disclosure describes methods and systems, including computer-implemented methods, computer program products, and computer systems for generating suggested enhancements for use in document extensions.

In an implementation, a method is provided for generating suggestions for extensions to data sets. Using metadata for a plurality of documents, data relationships are determined between sets of documents of the plurality of documents. Each set of documents originates from different data sources and does not share common ontologies. The metadata includes terms and labels for documents in the plurality of documents. Using the determined data relationships, enhancement suggestions are determined. Each enhancement suggestion identifies pieces of information from at least one first document in the set of documents that can serve as an extension to information contained in a second document in the set of documents. The identified enhancement suggestions are ranked based on enhancement usability ranking factors. The ranked enhancement suggestions are provided.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, meaningful enrichments can automatically be determined for customer data sets from any registered data source. Second, an automatic provisioning of enrichments can allow for extension of an analysis scope without intensive manual work. Third, the use of metadata in identifying potential enrichments to data sets has the advantage of not requiring access to all of the data in the data set. Fourth, reduced manual work is needed by an end user to find an appropriate extension because the system can automatically find meaningful extensions in the document corpus known to the system. For example, extensions can be ranked according to their applicability for a specific use case using a combination of semantic, usage, and technical ranking methods. Fifth, manual work needed by the end user can be reduced for the integration of the extension into the customer data set. This is because the system can automatically extract the requested extension data and add the customer dataset to the extension, including optionally combining data from multiple extension data sources into an extension. Sixth, the approaches described herein have advantages over other approaches because, for example, different methods for schema mapping can be combined, such as metadata analysis, pattern matching, semantic labeling (both manual and automatic), and other methods. Seventh, the system can use an iterative clustering approach that avoids, for example, the application of expensive schema matching methods, thus leading to increased performance and reduced resource consumption. Eighth, the system can support a flexible mechanism for the integration of external ontologies and an automatic extraction of ontologies from the user documents, allowing for accurate adaptation of extension ranking to specific user requirements. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 11 is a flowchart of an example method for generating suggested enhancements for use in document extensions, according to an implementation.

Like reference numbers and designations in the various drawings indicate like elements.

DETAILED DESCRIPTION

Figure 1:
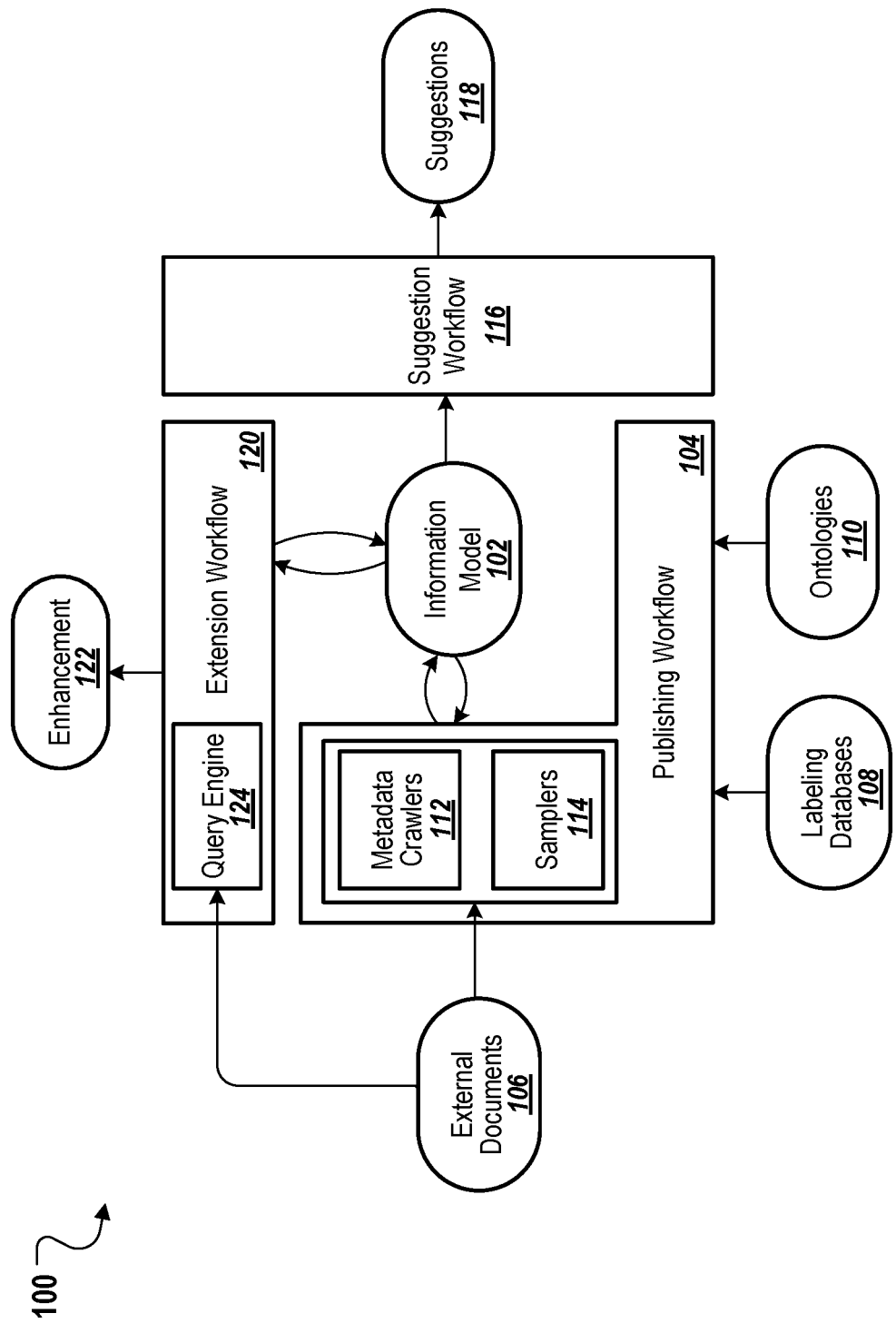
FIG. 1 is a block diagram illustrating an example system for generating suggested document extensions, according to an implementation.

The following detailed description describes the generation of suggested enhancements for use in document extensions and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

The present disclosure provides techniques that allow for significant acceleration and automation of data integration processes. For example, a system can automatically find relationships between data sets from different heterogeneous data sources based on different labeling mechanisms and ontologies analysis. The system can recognize which data sets are related by common topics contained in the data sets and then determine possible enhancements that one data set can provide to another data set. The system can use machine learning techniques to automatically adapt to user requirements and to produce more accurate results over time.

Existing systems, for example, that target the same tasks described herein may be based either on an analysis of metadata or on a manual or automated labeling of the data. Approaches described herein can combine different possibilities for label generation and can also introduce a recommendation-like approach for better ranking of the enhancements based on unified ontologies that are processed. As such, approaches described herein can serve the following purposes: 1) finding relationships between documents originating from different data sources that do not share a common ontology, and 2) finding and ranking pieces of information from one document that can serve as extension to the information contained in another document.

Documents, for example, can include structured data sources such as relational tables, multi-dimensional cubes in a database, or other data structures. Further, approaches described herein can be extendable to other data sources, including web application programming interfaces (APIs), resource description framework (RDF) data sources, semi-structured documents, and unstructured documents.

In some cases, approaches described herein generally may not have access to entire documents or all the data contained within a document for the purpose of extensive analysis. For example, it may not be possible to gain access to all data in a data set. Limits to document access can exist, for example, because of design constraints (such as limits invoked by the use of web APIs), legal issues (such as data privacy), or because information in a document is constantly changing or streaming. For these reasons, approaches can first attempt to identify and suggest potential relationships between documents on a metadata level using techniques that can typically use possibly less information for each document. Using the identified relationships, extensions can be suggested to a user, and upon selection of a particular extension, further analysis can be performed to verify the extension. The results of this analysis can be stored and used over time to improve the success of the approaches.

A goal of the approaches described herein can include, for example, to find relationships between documents from very different data sources, including data sources that share neither a common data model nor a common formalism for describing data models. Thus, identifying possible relationships can use common approaches that are neither data model specific or formalism specific. For example, approaches can use semantic information extracted from the documents for this purpose. The semantic information can be represented, for example, as a set of labels, each label including a numeric coefficient that expresses an affiliation between the label and a corresponding document (or a specific portion of the document).

In some implementations, techniques that are used to generate the labels can differ in their complexity and demand on computational resources. For example, a first technique can be based on mining metadata of the documents, such as using so-called metadata crawlers. In another example, various techniques can be used for pattern recognition on data samples taken from the documents. In yet another example, using techniques that may be computationally intensive, data samples can be used to perform labeling, e.g., using labeling databases. Once labels are determined using one or more various techniques, resulting label sets can be used to find matches between documents, such as by applying clustering algorithms to the labels and by using ontologies to find possible extensions from un-related label sets.

Design principals for use of the techniques can include factors related, for example, to performance, meaningful ranking of suggestions, and extensibility. Performance can be extremely important, as performance can affect user experience, including system response time, during both an initial publishing of a document into the system and during the generation of the suggestions for the extensions. Meaningful ranking of suggested extensions is another vital factor because of effects on the user's trust in the system. Extensibility is important because extensibility can allow for integration of new data sources, additional labeling databases, and ontologies.

Because of amount of information that the system must be able to handle, the appropriate performance cannot be achieved just using the standard approaches such as parallelization and scale-out. Instead, performance can be improved, for example, by designing the operation of the system so that attempts are made reduce the number of expensive tasks from the beginning on.

Labeling, for example, can have a significant effect on performance. For example, comparing actual strings on a word-to-word level in the documents can be extremely performance intensive and may be possible without access to a complete document. To improve performance approaches can compare sets of labels describing documents, which can be more time efficient.

Further, detailed analysis can wait until after a user has selected a specific suggestion to generate an enhancement. For example, after a user selection of a suggestion, a next iteration can be performed that compares the data contained in two documents to find the matches. This consideration also takes into account the fact that each particular document may never be demanded in user scenarios, for example, in which no user will either want to extend the document or to use the document as a source for extensions.

In some implementations, a suggestion proposed solely on the basis of semantic labeling can be found to be invalid, for example, if two tables have columns labeled "city" or "town," respectively, but the actual values in these columns never match. In this situation, a suggestion for an extension may not be able to be generated. Further, approaches can attempt to reduce the situations in which labels, as well as data samples from the documents, need to be generated altogether. The ability to generate suggestions can, for example, depend on the kind of extensions in which the user is interested. For example, if the user wants to extend a data set with additional instances of the same type, such as adding a set of additional cities into the document, then a "city"/"town"-based extension may be exactly the kind of extension that would benefit the user.

Ranking suggestions for extensions can improve the user's experience because having ranked suggestions can make the suggestions more useable, for example, as compared providing just the first suggestions that are determined. Ranking techniques can include, for example, a combination of semantic ranking, matching ranking, and usage ranking.

Semantic ranking, for example, can be based on an analyses of the semantic labels described above. The quality of this kind of ranking can depend, for example, on the labeling databases and ontologies that are deployed. However, by selecting labeling databases and ontologies that are suitable for a particular use cases, for example medical or financial applications, the quality of the results of semantic ranking can be improved.

Matching ranking, for example, can be more computationally intensive, and thus can be reserved for suggestions selected by a user. Matching ranking can determine, for example, how well instances of two topics fit together. For instances of topics A and B, matching ranking can be given by (Equation 1):

$$R_{AB}^M = \frac{A \cap B}{A}, \qquad (1)$$

where $R_{AB}^M$ is a ranking matching for topics A and B, and noting that $R_{AB}^M \neq R_{BA}^M$. Calculated matching rankings can be stored and used for future rank calculations.

Usage ranking, for example, can be based on the usage of the ranking by the user. For example, the system can store information over time regarding which suggestions are often selected by the user, and the stored information can be taken into account when calculating the suggestions at subsequent times. Although this ranking approach can be useful, usage ranking cannot be applied until some usage information has been gathered.

Semantic ranking can be fine-tuned over time based on extensibility capabilities of the system. For example, based on the particular needs of a user, the system can be extended to use specialized labeling databases and ontologies that are best suited for a particular scenario. For this reason, it can be useful for the system to allow a non-interrupting way of adding and removing data sources for use with metadata crawlers and samplers, patterns matchers, labeling databases and ontologies.

FIG. 1 is a block diagram illustrating an example system 100 for generating suggested document extensions, according to an implementation. The system 100 includes an information model 102 at the core of the system 100. The information model 102 stores relationships between documents, semantic information about the documents, and possible extensions. The information model 102 is described in more detail below with reference to FIG. 2.

A publishing workflow 104 can fill the information model 102 with terms and labels that are extracted from external documents such as documents 106. The terms and labels can be enriched with the semantic data from labeling databases 108 and ontologies 110 available to the system 100. Access to the documents 106 can be implemented using, for example, metadata crawlers 112 and samplers 114. In some implementations, metadata crawlers 112 and samplers 114 can be specific to a particular document type or data source. The system 100 can allow for an easy integration of additional data sources by implementing corresponding metadata crawlers 112 and samplers 114. More detailed information regarding the publishing workflow 104 is provided below with reference to FIG. 3.

A suggestion workflow 116 can generate a ranked list of enhancement suggestions 118 for a given document. More detailed information regarding the suggestion workflow 116 is provided below with reference to FIG. 7.

An extension workflow 120 can generate an enhancement 122 based on the suggestion 118 that is selected by a user of the system 100. An enhancement 122 can be considered as (or be used to create) a new document combined from the two documents defined by the suggestion 118. In contrast to the enhancement 122, an extension in the present disclosure just specifies a possibility to construct an enhancement 122. The extension workflow 120 can also update the information model 102 with information, for example, identifying a matching rank of two documents from which the extension is suggested and information regarding the use of the suggestion 118 for the enhancement 122.

A goal of the extension workflow 120 is the generation of a new document that combines, for example, instances of a topic from one document 106 and corresponding instances of the term from another document 106. The new document can be referred to as the enhancement 122. A query engine 124, for example, can generate the enhancements 122. In some implementations, generation of enhancements 122 can be done using third-party components.

In some implementations, the system 100 can also benefit from a collection of administrative workflows that are necessary, for example, for administration of the system 100 and user adjustments. The administrative workflows can include workflows, for example, for the integration of new document facilities, for labeling databases and ontologies on one side and user-defined adjustments to the information model 102 on the other.

Figure 2:
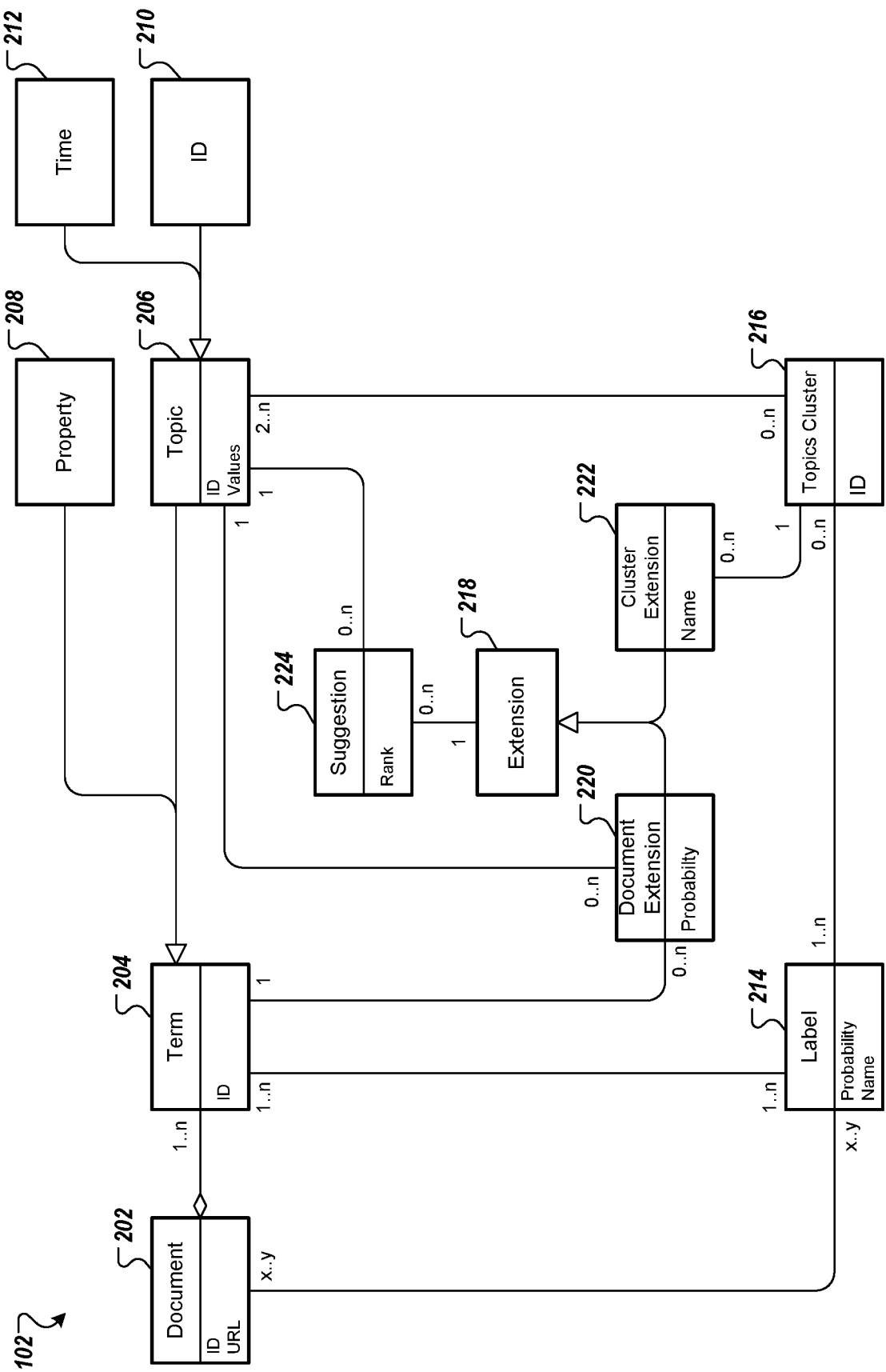
FIG. 2 is a block diagram illustrating an example information model, according to an implementation.

FIG. 2 is a block diagram illustrating an example information model 102, according to an implementation. A document 202 represents a coherent data set which can be accessed, for example, using a specific uniform resource locator (URL). Examples of documents 202 include tables, views in a relational data base, multi-dimensional cubes, WIKIDATA databases, or web representational state transfer (REST) APIs. URLs, for example, can have the form: <metadata crawler type>://<connection>/<local path>.

The information model 102 is based on the concept of terms 204. Each term 204 represents a distinguished combination of an identifier (ID), a set of labels (also known as names, tags, and categories), and a value domain. Each value from the domain is called a term instance or just an instance. Terms 204 can be extracted from the documents using crawlers. An example of a term is a column in a relation table.

Different types of term 204 can exist, depending on their usage. A topic 206, for example, can include terms that are used to relate different documents 106 based on the assumption that, if two terms share the same instances, them the two terms should represent the same real-world entity. This assumption is not always valid, as the number 17, for example, can be an instance of very different unrelated terms such as price, weigh, or count. In another example, a string such as "Berlin" appearing as an instance of two different terms may indeed indicate a relation between these terms.

The initial determination of the type of a term 204 can be performed, for example, by the metadata crawlers 112. In a generalized case, for example, based on the technical type of the underlying term, string terms 204 can be considered to be topics 206 and all other terms 204 can be considered to be properties 208.

The handling of topics 206 can be the most resource expensive in the system 100, as identification of topics 206 can require sampling and labeling, which are resource and time consuming tasks. For this reason, it can be beneficial to reduce the number of topics 206 where possible. For example, when multiple metadata crawlers 112 are used for a document 106, and at least one of the metadata crawlers 112 classifies a term 204 as a property 208, the classification of property 208 wins out over topic 206.

An ID 210 is a special form of a topic 206. Though the ID 210 can be used to relate two documents 106, resulting labeling will make no sense. A time 212 is another special kind of topic 206 that can be related only with another time 212 topic 206.

The property 208 is a term 204 which is not used for establishing relationships between documents 106. Instead, the property 208 can serve as an extension to a topic 206 in the same document 202. Properties 208 can require minimal resource and time consumption, as properties are not used in clustering, sampling, and labeling.

A label 214 can include an actual string value, a source identifier, and a probability. For the metadata-based labels, the probability can always be 1.0, as compared to sample-based labels for which the probability can be calculated as a fraction of samples having this label to the whole number of samples. Labels 214 can be attached to terms 204, documents 202, and topic clusters 216. The string value of a label 214 can describe the semantic or meaning of the object to which the label belongs. Thus, labels 214 can play a central role in the system 100, as the similarity of the terms and documents are determined by analyzing their corresponding labels sets.

The topic cluster 216 can combine together similar topics 206. The topics 206 in a topic cluster 216, for example, normally belong to the different documents 202, although there can also be situations where one document 202 contains different similar topics 206.

An extension 218 can represent a combination of a topic 206 with a term 204 that provides additional information for it, such as a city topic and a population property. Extensions 218 can be constructed, for example, based on a document 202 or on a topics cluster 216 connected to a general propose database. A document extension 220 can represent a combination of two terms from which one is a topic and another is an extension to this topic. In a document extension 220, both terms belong to the same document. A cluster extension 222, for example, can be valid for all topics in the cluster. The cluster extension 222 can normally be based on an ontology together with a database, such as a Wiki source.

A suggestion 224 can combine a topic 206 from one document with either a document or a cluster extension. In the case of the document extension, the extension's topic generally belongs to the document.

Figure 3:
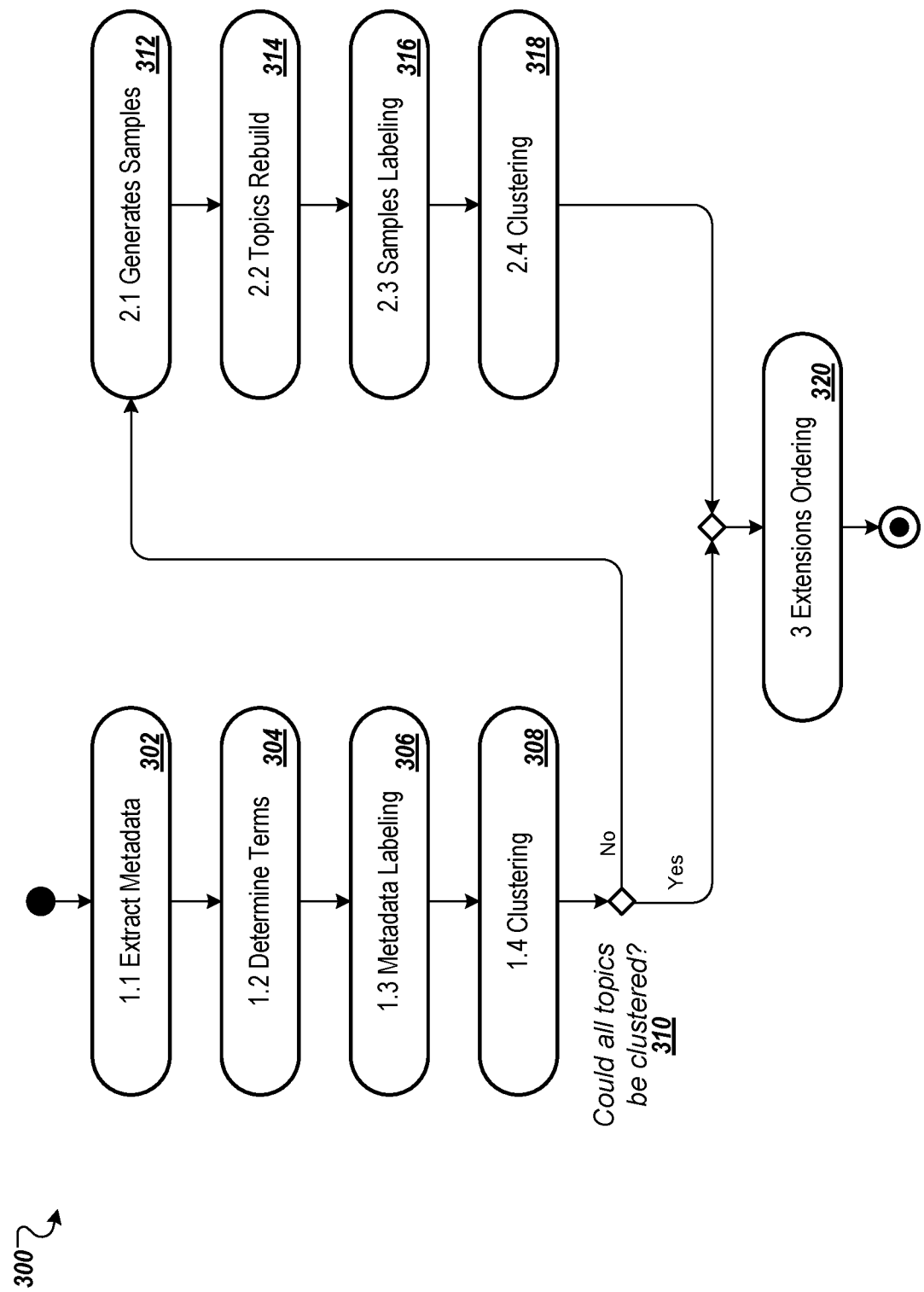
FIG. 3 is a flowchart of an example publishing workflow, according to an implementation.

FIG. 3 is a flowchart of an example publishing workflow 300, according to an implementation. In an extraction step 302, metadata for a document is obtained that represents all the information one can obtain about a data set without actually analyzing the data contained in the data set. The metadata for a data set can be provided, for example, by the components called metadata extractors. Metadata extractors are normally bound to the type of the data source, such as Java Database Connectivity (JDBC) for structured query language (SQL) databases, and WIKIDATA or FIREFLY for multi-dimensional cubes. One document can have multiple metadata extractors associated with it.

Figure 4:
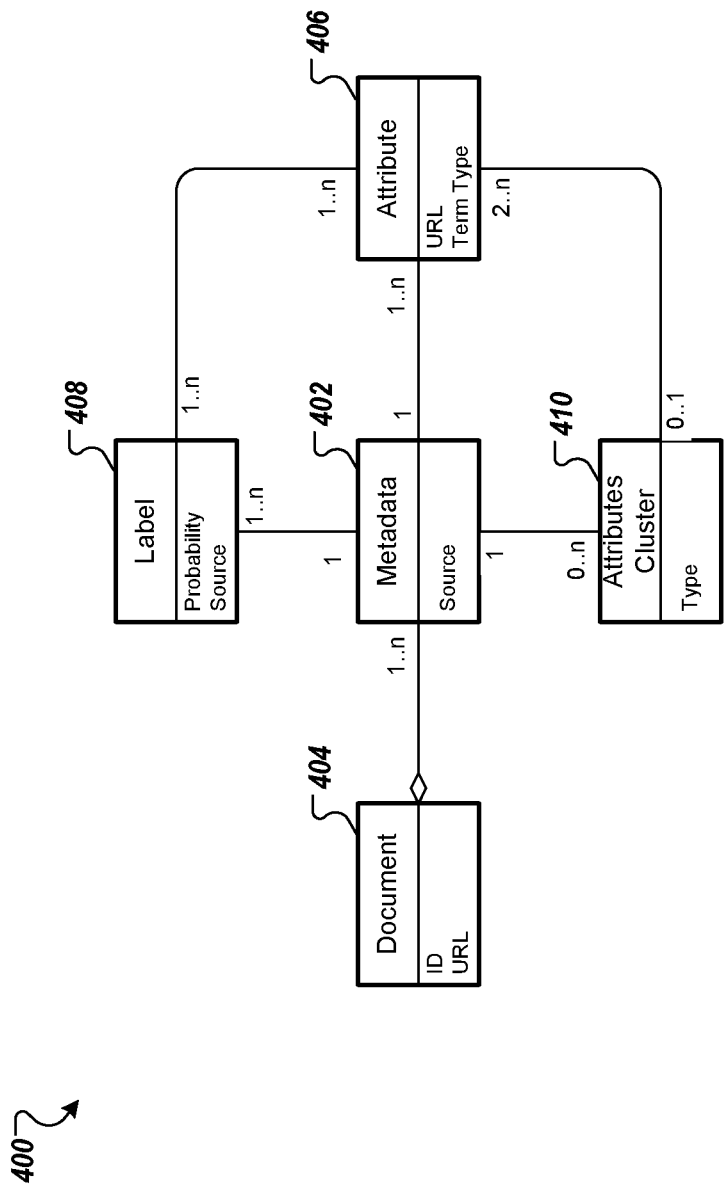
FIG. 4 is a block diagram illustrating an example metadata model, according to an implementation.

FIG. 4 is a block diagram illustrating an example metadata model 400, according to an implementation. Each metadata extractor produces a metadata object 402 which comprises, from the same document 404, attributes 406, one or more labels 408, and optionally attribute clusters 410. Example attribute 406 includes a column of a table, a class in WIKIDATA, or an object property in JavaScript object notation (JSON) document. An attribute cluster 410 can combine together attributes 406 that are semantically related, such as all columns of a dimension in an online analytical processing (OLAP) cube. Each attribute must have at least one label 408.

Referring again to FIG. 3, the workflow includes step 304 for determining terms and step 306 for labeling metadata. For example, the system 100 can combine attributes from different metadata crawlers and generates terms from them, and some attributes, for example, having the same local path in the URL, can be considered to contribute to the same term. The labels from different attributes can be combined without duplicates into the label set of a term. The probability of the metadata labels can always be set to 1.0. The term type can generally be selected so that the number of topics stays as small as possible. At step 308, the system can try to perform the clustering of the topics, for example, using the algorithms described below.

Figure 5:
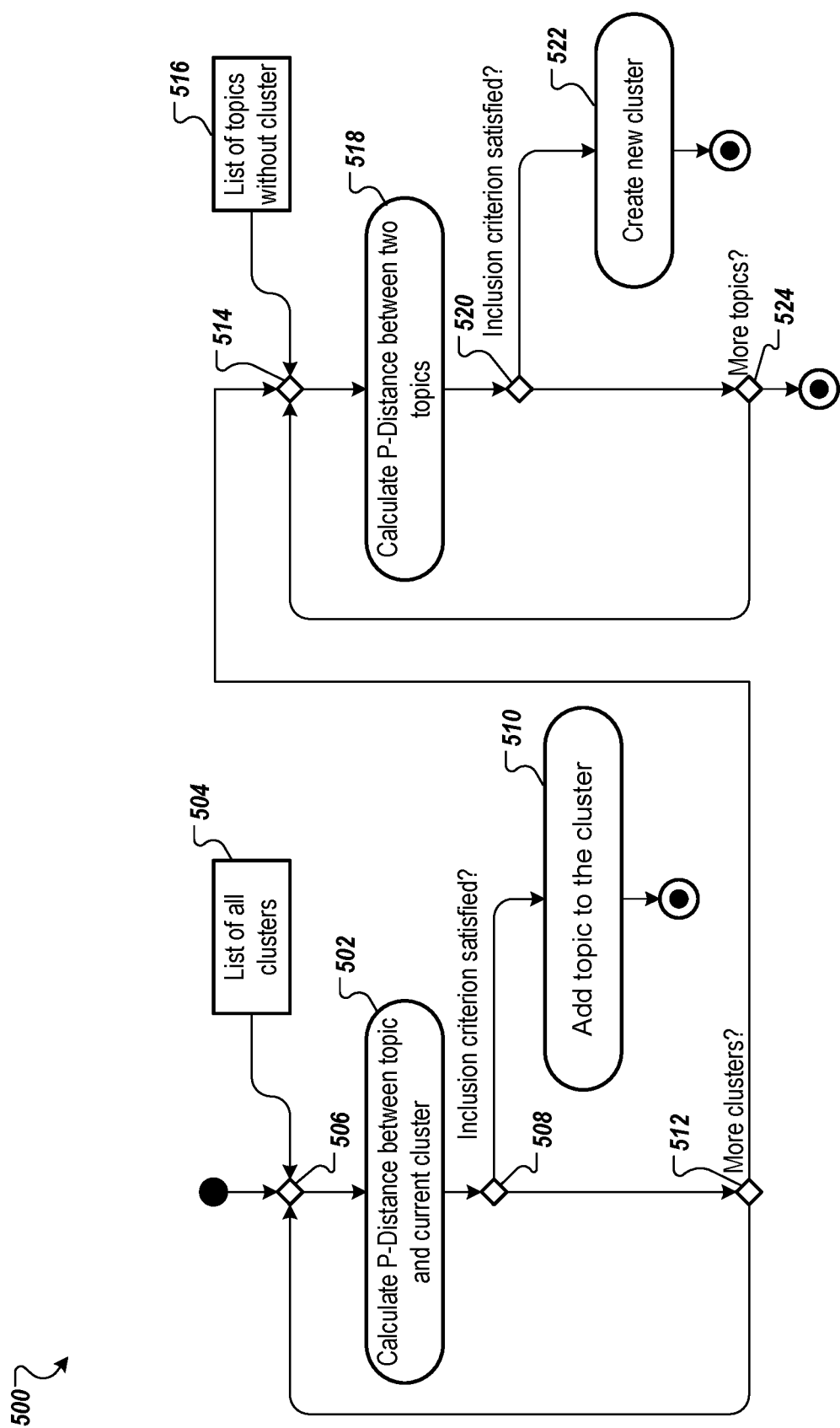
FIG. 5 is a flowchart of an example clustering algorithm, according to an implementation.

FIG. 5 is a flowchart of an example clustering algorithm 500, according to an implementation. The system first tries to assign a new topic to an existing cluster, and if this fails, a new cluster can be created with other yet non-clustered topics. Implementing the clustering can rely on calculating the distance between a topic and the current cluster (step 502). For example, a P-distance $D_{AB}^P$ between topic A and B (or between topic A and topic cluster B) can be defined by Equation 2:

$$D_{AB}^P = \Sigma_{i \in A \setminus B} p_i + \Sigma_{j \in B \setminus A} p_j + \Sigma_{k \in \cap B} |p_k^A - p_k^B| \qquad (2).$$

In Equation 2, the first summation is over the probabilities of all labels that belong to topic A but not to topic B. The second summation includes all labels that belong to topic B but not to topic A. The third summation includes the intersection of topics A and B. This P-distance $D_{AB}^P$ decreases with the increasing number of common labels with similar probabilities shared by two topics (or by a topic and a cluster). Other ways can be used to calculate the P-Distance.

Clustering techniques can generally require at least a distance definition and a criterion for handling small distances. Because the distance calculation alone may not be sufficient for implementing clustering, a judgment criterion, for example, can be used for determining when the distance is small enough for two topics to share the same cluster, as shown in Criterion 3:

$$D_{AB}^P < L_A^P \text{ and } D_{AB}^P < L_B^P \qquad (3).$$

Here, $L_A^P$ and $L_B^P$ are the lengths of the topics A and B, respectively, and can be calculated simply as the sums of the probabilities of their labels. The inclusion criterion implies that the distance between the topics must be smaller than the length of any of these topics. One can show that, to fulfill these criterion, two topics must share more than 50% of the labels with similar probability.

Referring again to FIG. 3, at step 310, a determination is made as to whether all topics could be clustered. If not, then steps 312-318 (similar to steps 302-308) are performed to generate samples, re-build topics, label samples, and cluster the samples. At step 320, the extensions can be ordered.

At step 312, for example, samples are generated. The samples generation is performed only for the topics which could not be clustered using metadata labels. Samples are typically not stored in order to avoid possible legal issues.

At step 314, topics are reduced, as topics are re-built. In this step, an analysis is performed of the samples from the topics using pattern matching and machine learning classification methods with a goal of detecting known types of the topics. This can allow the system to avoid relatively expensive labeling of samples, when possible. The list of the known types is dynamic and can be extended as necessary. Technically, these types can be represented again as labels on the topics, and the types can be used for clustering and extensions generation in the similar ways as other labels. At step 316, samples labeling occurs.

The most important types can include the following. Local IDs, for example, include unique identifiers which are often used in tables as surrogate primary keys generated by the system for which a document has been created. It is generally not necessary to label them using a labeling database as they have only technical meaning in the scope of the origin system. Global IDs, for example, can represent semantic entities such as e-mails, telephone numbers, and web URLs that are likely to be unique in the known world. Such IDs can be extremely useful for connecting documents from disparate data sources. Thus, extending the facilities to recognize global IDs can be very important for improving the system. Descriptions, for example, are texts which can often be used in the structured documents to provide additional information for a particular entity in a free form. Descriptions may typically not be used with labeling databases but can serve as a source for additional labeling. The descriptions can be handled, for example, as properties. Numbers, for example, can be identified in terms having string-like technical types and that actually contains numbers. Numbers can be classified as topics by metadata extractors. When the system recognizes that, the system changes such topics to properties instead. Dates or time, as in the case with numbers, are also often found to be residing inside string fields. The system can handle date and time as time-type topics.

Figure 6:
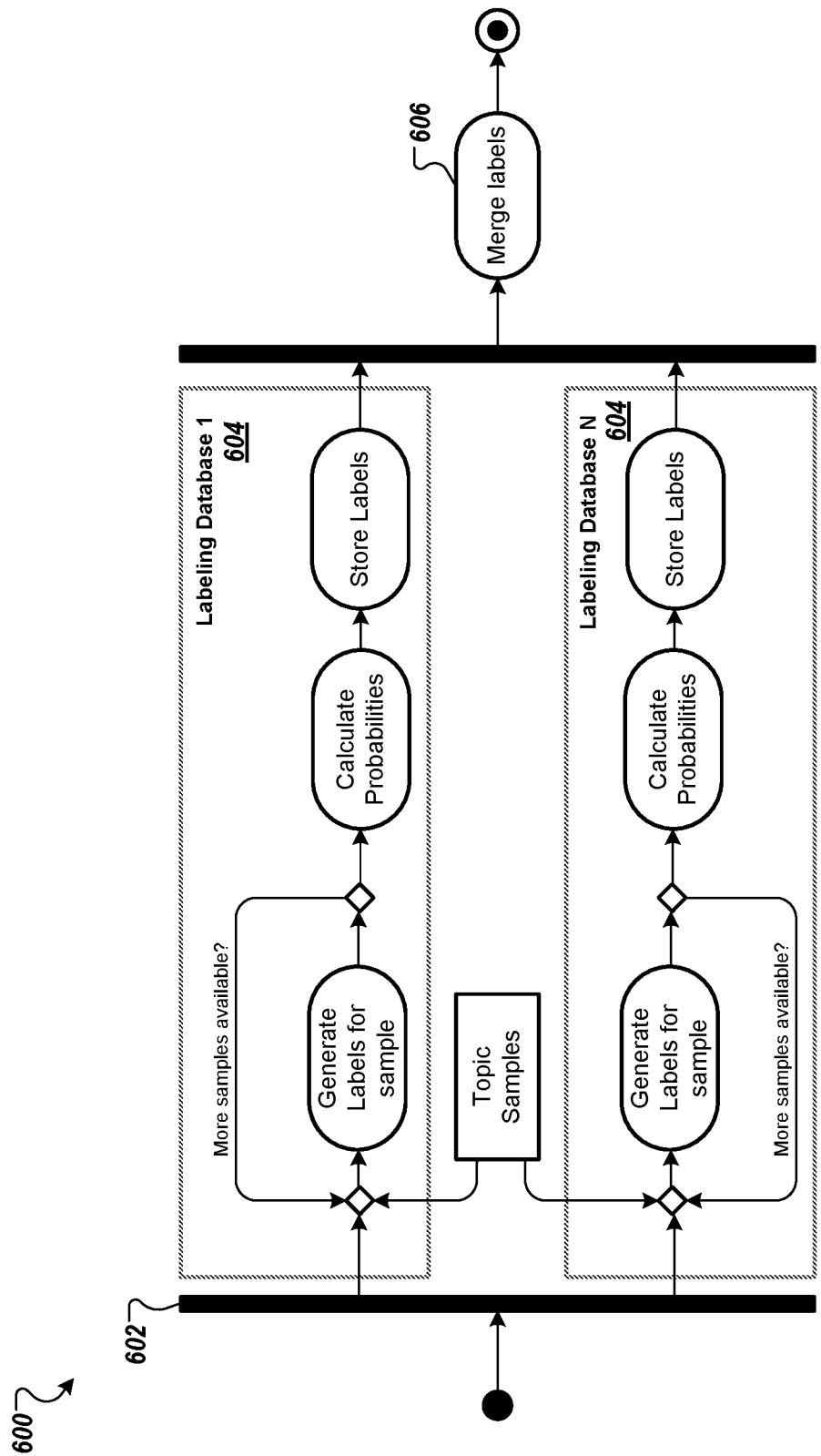
FIG. 6 is a flowchart of an example samples labeling procedure, according to an implementation.

FIG. 6 is a flowchart of an example samples labeling procedure 600, according to an implementation. For example, the samples labeling procedure 600 can be performed using parallel processing 602, such as when multiple labeling databases 604 are in use.

In a merge labels step 606, a number of post processing actions can be performed, such as actual merging, splitting and filtering. In the action of actual merging, for example, the labels from different labeling databases can be assigned different source values. The merging can mainly remove this differentiation and adjust the resulting probability in case the same label exists in different sources by taking the highest one, although other approaches are also possible. The comparison of labels can generally be case insensitive.

In the action of splitting, for example, some labeling databases 604 can return labels consisting of multiple parts, such as "American country" and "European country." In this example, it can be helpful to have the label "country." Splitting can often require removal of stop words.

The action of filtering, for example, can be used when a topic gets quite a long list of semantically dissimilar labels, such as "country" and "music album." For example, these labels can have very different probabilities, such as 0.8 for "country" and 0.01 for "music album." In this case, keeping the label "music album" can be unnecessary. In some implementations, in order to avoid the flood of non-useful labels, the system can use the following label reduction rules. Only labels with probability>0.5 are kept in cases in which such labels exist. If no such labels exist that have a probability>0.5, then only a configured number of labels with highest probabilities are kept. After the samples labeling is finished, the system can perform a second clustering attempt, as described above with reference to FIG. 3.

Referring again to FIG. 3, at step 318, clustering of label sets generated from the samples occurs. At step 320, extensions are ordered. In this step, the system can generate extensions from the document being published. As described in more detail below, an extension can consist of a topic together with a term and a coefficient which indicates how tightly this term is related to the topic. The coefficient can be, for example, a number between 0 and 1, inclusive. In some implementations, at least two approaches can be used by the system to determine this coefficient.

A first example approach uses document structure. In some implementations, the generation of extensions based on the document structure can be performed in the following way. If a document contains only one topic, for example, then an extension with a coefficient of 1.0 can be created for all combinations of this topic with other terms (which are all properties in this case). If more than one topic exists for the document, then an extension with a coefficient of 0.0 can be created for each possible combination of all topics with all terms in the document. Then a new extension with a coefficient of 1.0 can be created for each combination of topic and term which belong to the same cluster. This step can be performed, for example, in cases in which any attributes cluster was defined by the metadata crawlers.

A first example approach uses ontologies. An ontology can be represented, for example, as a set of tuples of the form (Equation 4):

$$\{\text{ontology ID}, \text{label1}, \text{label2}, \text{affinity coefficient}\} \quad (4).$$

When building extensions from ontologies, the system can search each ontology for the labels of the topic, such as in the label1 position of Equation 4 and the labels of the term as label2 of Equation 4. When a matching entry is found, a new extension can be created with a corresponding topic, a term, and the affinity coefficient. If multiple extensions with the same topic and term are created from the same ontology, such as because both the topic and the term can have multiple labels assigned to them, thus matching multiple tuples in the ontology, then the system can still create only one extension with the maximal affinity coefficient.

Figure 7:
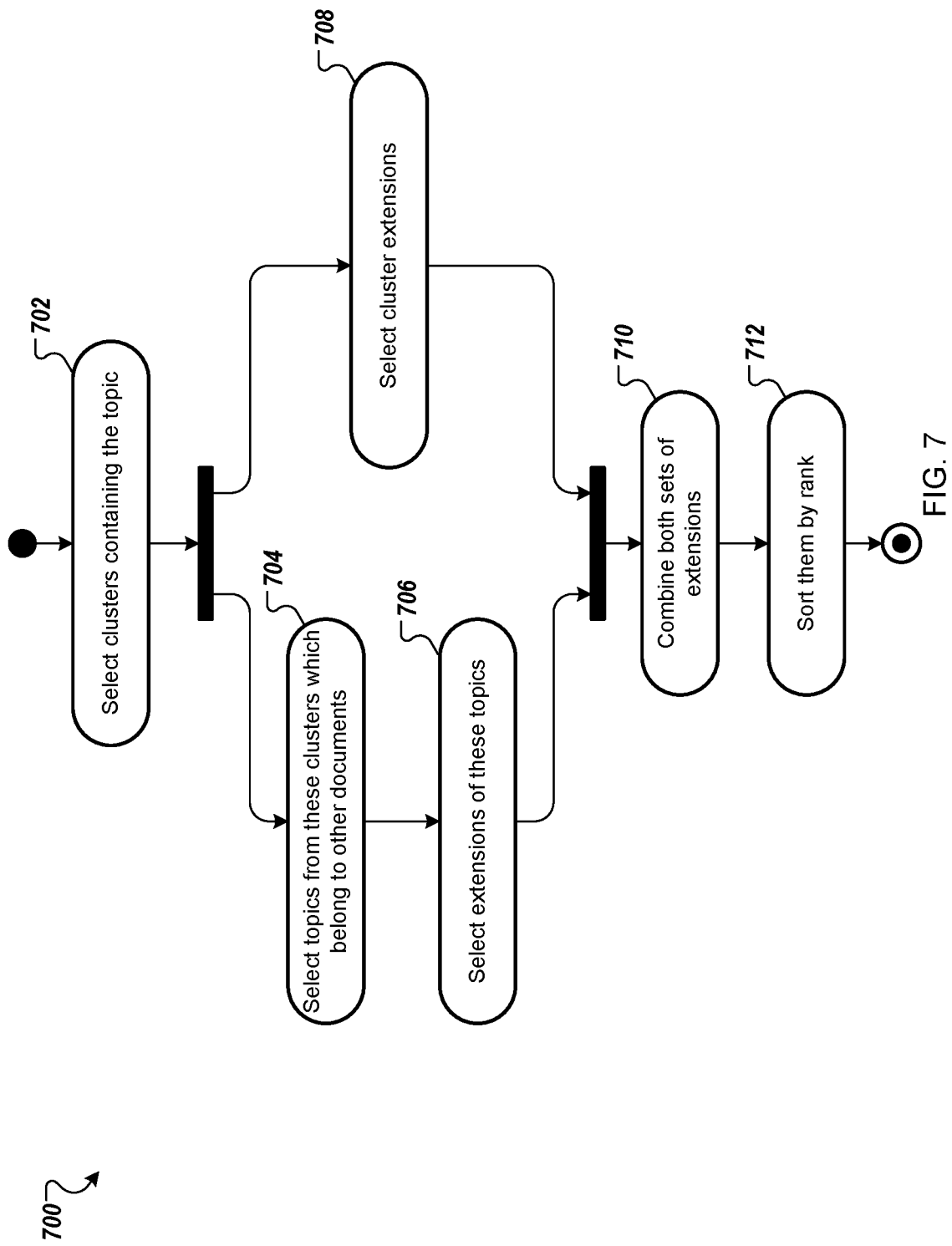
FIG. 7 is a flowchart of an example suggestion workflow, according to an implementation.

FIG. 7 is a flowchart of an example suggestion workflow 700, according to an implementation. At 702, clusters containing a topic are selected. At 704, topics that belong to other documents are selected from the clusters. At 706, extensions of the topics are selected. At 708, cluster extensions are selected. At 710, both sets of extensions are combined. The extensions are ranked and sorted by rank at step 712.

A suggestion, for example, is a combination of a topic and an extension. Expressed more generally, a suggestion S for topic T from is tuple can be of the form (Equation 5):

$$S => \{T, J, X, r\} \quad (5),$$

where J is either another topic which shares the same cluster with T but belongs to another document or the cluster to which T belongs. The combination of T and J can be considered as a join condition for building the corresponding enhancement from this suggestion. X is either a term from the same document as J (in the case of document extension) or a cluster related property (in case of cluster extension). In the case of document extension, X can also be a topic, but then X should not be in the same cluster with J. The r term in the equation is the combined rank of the suggestion calculated as (Equation 6):

$$r = \text{Semantic rank of underlying extension} \times \text{Matching coefficient} \times \text{Usage coefficient} \quad (6).$$

As long as the matching and usage coefficients for a specific suggestion are not calculated explicitly, such as if the suggestion is never selected by a user, then the coefficients are assumed to be 1.0. Semantic rankings can be calculated separately for each ontology known to the system. For the aggregated calculation, the maximal coefficient available can be used.

Figure 8:
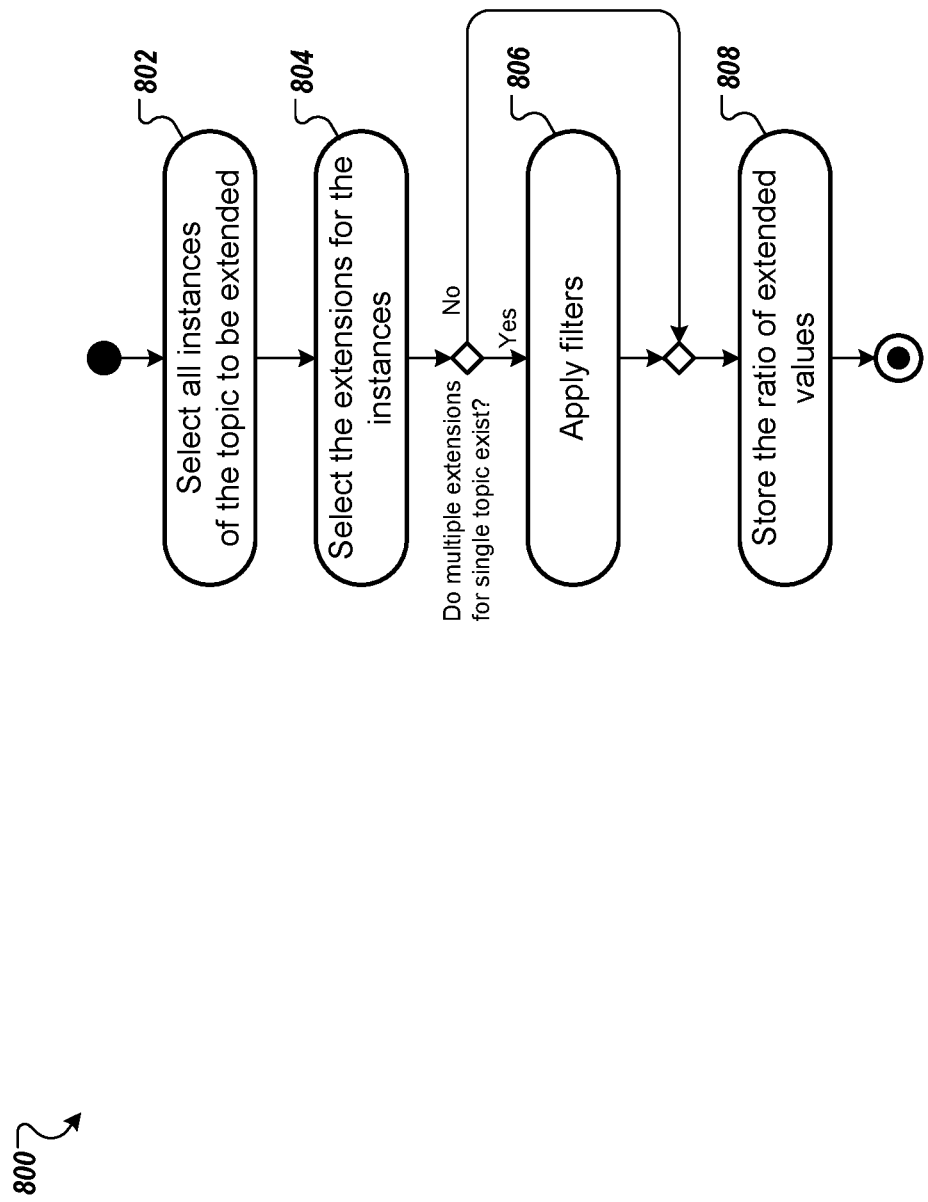
FIG. 8 is a flowchart of an example enhancements generation workflow, according to an implementation.

FIG. 8 is a flowchart of an example enhancements generation workflow 800, according to an implementation. In step 802, all instances of the subject topic are retrieved from the corresponding document. Some types of data sources, such as Web APIs, may not support such functionality. As such, documents in such data sources can only serve as a source of extensions but cannot be extended. In step 804, extensions are selected for the instances.

In step 806, the values retrieved previously are used to filter the instances of the join topic in the second document and retrieve the instances of the corresponding extension term. Ratios of extended values are stored at step 808.

The query engine depends highly on the capabilities of the data sources. Common challenges the query engine can deal with include: 1) fuzzy matching of the topics instances; 2) same instances in the different documents having different spelling, for example, if different letter cases prevent exact matching; and 3) filtering of multiple objects instances for a single subject instance.

It can be common that a document containing multiple topics has properties which refer not to single topic but to a combination of topics. An example is a table containing country, year, and population that will have multiple values for population for each country, depending on the year. The query engine can detect such situations and give the user the possibility to specify filters on the secondary topics.

Figure 9:
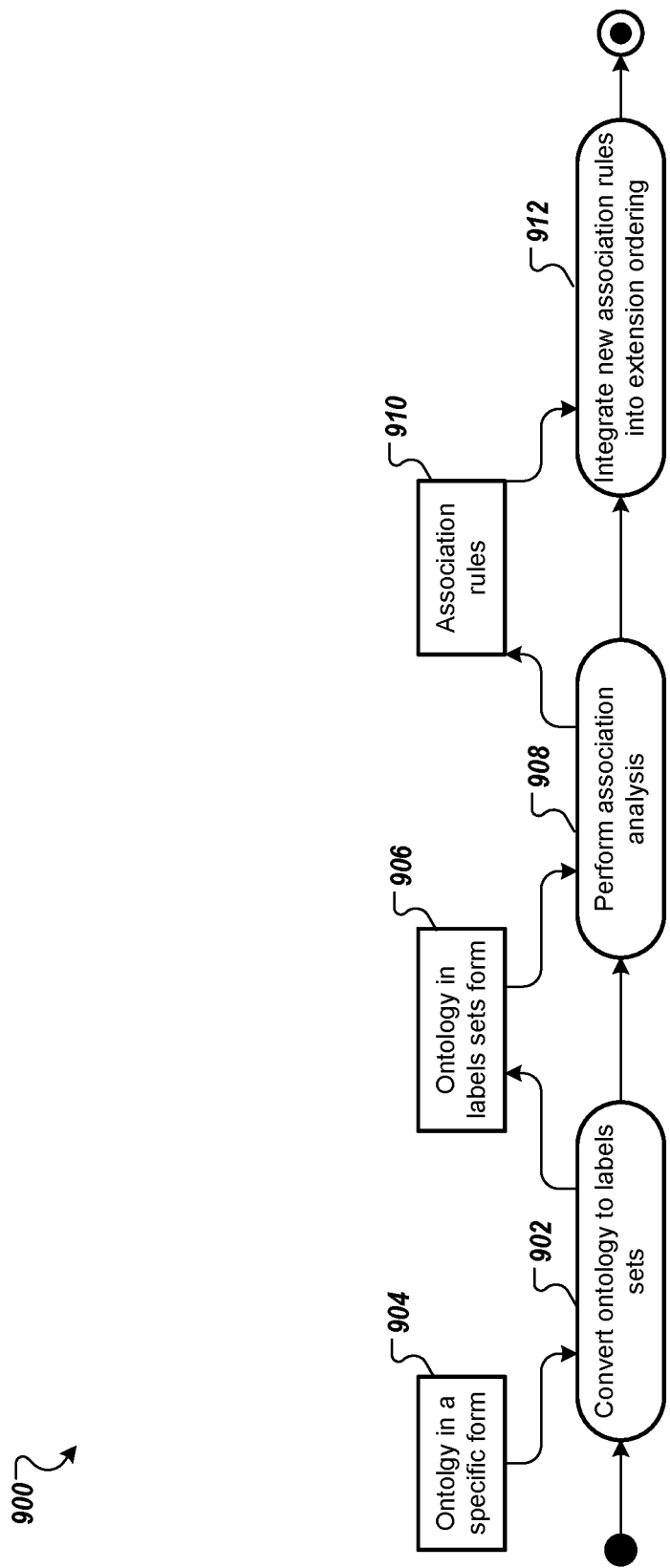
FIG. 9 is a flowchart of an example ontology import workflow, according to an implementation.

FIG. 9 is a flowchart of an example ontology import workflow 900, according to an implementation. The ontology import can be one of various administration workflows that serve for the extension of the system and user specific adjustments. At step 902, an ontology 904 in its original form, for example WIKIDATA classes, is converted into sets of labels 906 representing each class. For example, the WIKIDATA class country can be used to generate a labels set {UID, Country, Continent, Capital, and so on for all its properties including those of the parent classes}, where UID is a generated unique identifier. When a class has multiple labels, the system can generate a cross product of all possible labels combinations. This is necessary in case for ontologies created from the documents published to the system.

At step 908, association analysis is performed on the generated labels sets using a suitable algorithm, such as an Apriori-Algorithm. This analysis can output, for example, association rules 910 of a form {label1, label2, support, confidence, lift}. The confidence can be used as the rank of the extension represented by label1 and label2.

At step 912, the system generates the infrastructure necessary to consume the association rules 910 when publishing new documents. Re-calculation of the extension ordering for already published documents can also happen at this time. The user can be given the possibility to overwrite the types of terms automatically detected by the system. This can be useful, for example, when the system creates topics instead of properties for string-like terms. The user can also have a possibility to add (or "tag") their own labels for terms. This can be useful for terms that were not labeled by the system in the appropriate way, such as what can happen with Web APIs.

Figure 10:
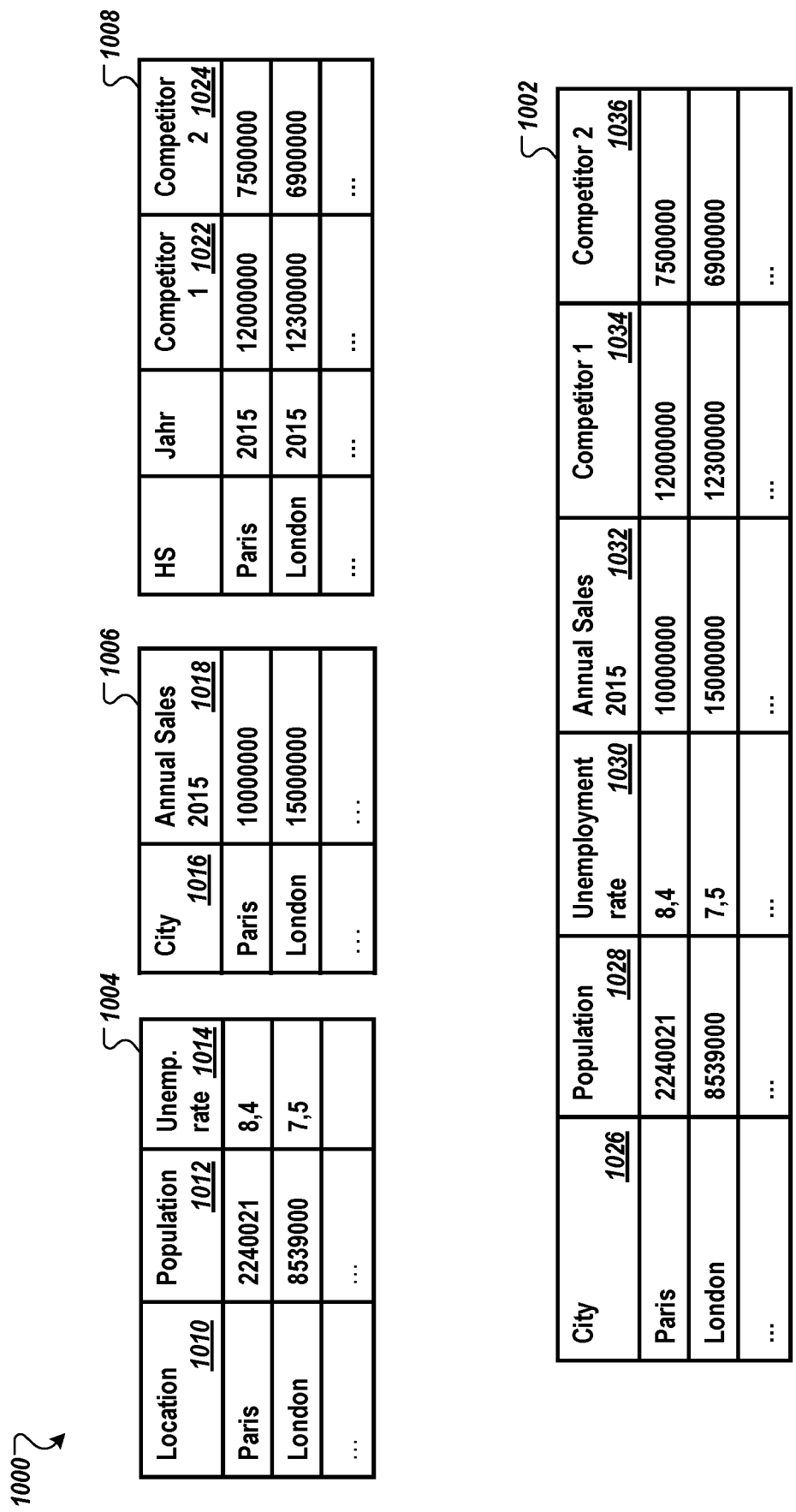
FIG. 10 is an example table layout showing an example extension, according to an implementation.

FIG. 10 is an example table layout 1000 showing an example extension 1002, according to an implementation. For example, tables 1004, 1006, and 1008 can be used to create the extension 1002. The table 1004, for example, includes a location column 1010, a population column 1012, and an unemployment rate column 1014. The table 1006, for example, includes a city column 1016 and an annual sales column 1018. The table 1008, for example, includes a competitor 1 column 1022 and a competitor 2 column 1024. In the extension 1002, a city column 1026 is based on the city column 1016, a population column 1028 is based on the population column 1012, an unemployment rate column 1030 is based on the unemployment rate column 1014, an annual sales column 1032 is based on the annual sales column 1018, a competitor 1 column 1034 is based on the competitor 1 column 1022, and a competitor 2 column 1036 is based on the competitor 2 column 1024.

This disclosure has described concepts of using labeling as a general framework for combining different approaches in document analysis: metadata analysis, pattern matching, values labeling and ontology analysis. These concepts are used in the system described above that is capable of analyzing and building relationships between different types of documents, including relational and multi-dimensional data sets, RDF databases, and Web APIs.

In some implementations, semantic similarity between labels can be measured. For example, different labeling methods can provide labels that are very similar in meaning but different in representation, such as like "city" and "town". In some implementations, appropriate facilities can discover that these labels are very close semantically, such as through the use of word vectors.

In some implementations, deep learning for patterns matching can be used. For example, in addition to implementations based on regular expressions and naïve Bayesian classifier used for reducing topics, deep learning methods for pattern recognition can be used.

In some implementations, approaches described above for text and media documents can be modified, or new approaches added, for unstructured text and multi-media documents.

FIG. 11 is a flowchart of an example method 1100 for generating suggested enhancements for use in document extensions, according to an implementation. For clarity of presentation, the description that follows generally describes method 1100 in the context of the other figures in this description. However, it will be understood that method 1100 may be performed, for example, by any suitable system, environment, software, and hardware, or a combination of systems, environments, software, and hardware as appropriate. In some implementations, various steps of method 1100 can be run in parallel, in combination, in loops, or in any order.

At 1102, data relationships are determined between sets of documents of the plurality of documents. The determining uses metadata for a plurality of documents. Each set of documents originates from different data sources and does not share common ontologies, such as structured data sources, relational tables, and multi-dimensional cubes in a database. The metadata includes terms and labels for documents in the plurality of documents. For example, the system 100 can determine that relationships exist among the tables 1004, 1006, and 1008. Although shown in FIG. 10 as tables, depicted as relational tables for example, two or more of the tables 1004, 1006, and 1008 can be from different sources, and some may not be relational tables. The relationships that are determined, in this example, can include determining that some of the tables share common columns. From 1102, method 1100 proceeds to 1104.

In some implementations, the determined data relationships can include a common column or field that is shared between the at least one first document and the second document. For example, the first and second documents may both have a City field, or the location column 1010 and the city column 1016 can be determined to be related, such as both containing names of locations.

At 1110, enhancement suggestions are determined using the determined data relationships. Each enhancement suggestion identifies pieces of information from at least one first document in the set of documents that can serve as an extension to information contained in a second document in the set of documents. For example, a suggested enhancement to the table 1004 can be an enhancement to extend the table using the annual sales column 1018 from the table 1006, among other extensions. From 1104, method 1100 proceeds to 1106.

At 1106, the identified enhancement suggestions are ranked based on enhancement usability ranking factors. The identified enhancement suggestions can be ranked, for example, based on the enhancement usability ranking factors can include determining an overall rank for each of the identified enhancement suggestions. In some implementations, the overall rank can be a function of a semantic ranking based on an analysis of semantic labels identified for the data relationships between sets of documents on which a given enhancement suggestion is based, a matching coefficient based on an analysis of how well instances of two topics match, a usage coefficient based on previous use, by the user, of the enhancement suggestion. From 1106, method 1100 proceeds to 1108.

At 1108, the ranked enhancement suggestions are provided. For example, the table 1002 can be provided for presentation to the user. From 1108, the method 1100 stops.

In some implementations, the method 1100 can further include receiving, from a user through a user interface, a selection of a particular enhancement from the ranked enhancement suggestions, and creating, using the particular enhancement, a new document. For example, from a user interface, the user can select particular ranked extension suggestions that identify particular fields that are used in the extensions.

In some implementations, the method 1100 can further include extracting the metadata, including the terms and labels, from the plurality of documents, storing, in the information model, the metadata, relationships between documents, semantic information about the documents, and enhancement suggestions, and using the information model for identifying the enhancement suggestions and for ranking the identified enhancement suggestions. For example, metadata crawlers can be used to crawl and extract the metadata from the tables 1004, 1006, 1008, and other documents. In some implementations, extracting the metadata can include using samplers to sample the plurality of documents to further identify the metadata. For example, instead of reviewing the names of the columns in the tables 1004, 1006, 1008, actual values in the tables can be read and compared, such as to search for data in common.

Figure 12:
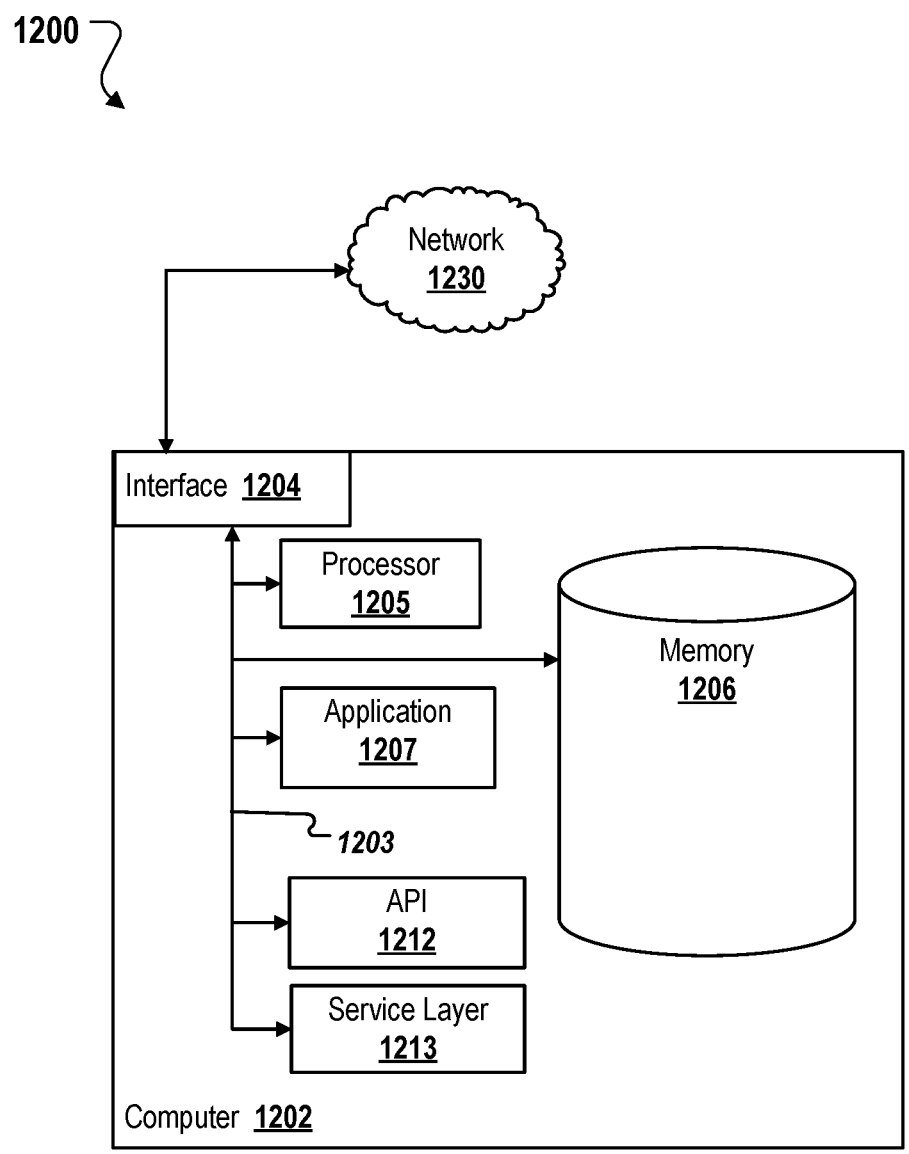
FIG. 12 is a block diagram illustrating an exemplary computer system used to provide computational functionalities associated with described algorithms, methods, functions, processes, flows, and procedures as described in the instant disclosure, according to an implementation.

FIG. 12 is a block diagram of an exemplary computer system 1200 used to provide computational functionalities associated with described algorithms, methods, functions, processes, flows, and procedures as described in the instant disclosure, according to an implementation. The illustrated computer 1202 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1202 may comprise a computer that includes an input device, such as a keypad, keyboard, touch screen, or other device that can accept user information, and an output device that conveys information associated with the operation of the computer 1202, including digital data, visual, or audio information (or a combination of information), or a graphical user interface (GUI).

The computer 1202 can serve in a role as a client, network component, a server, a database or other persistency, or any other component (or a combination of roles) of a computer system for performing the subject matter described in the instant disclosure. The illustrated computer 1202 is communicably coupled with a network 1230. In some implementations, one or more components of the computer 1202 may be configured to operate within environments, including cloud-computing-based, local, global, or other environment (or a combination of environments).

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, or other server (or a combination of servers).

The computer 1202 can receive requests over network 1230 from a client application (for example, executing on another computer 1202) and responding to the received requests by processing the said requests in an appropriate software application. In addition, requests may also be sent to the computer 1202 from internal users (for example, from a command console or by other appropriate access method), external or third-parties, other automated applications, as well as any other appropriate entities, individuals, systems, or computers.

Each of the components of the computer 1202 can communicate using a system bus 1203. In some implementations, any or all of the components of the computer 1202, both hardware or software (or a combination of hardware and software), may interface with each other or the interface 1204 (or a combination of both) over the system bus 1203 using an application programming interface (API) 1212 or a service layer 1213 (or a combination of the API 1212 and service layer 1213). The API 1212 may include specifications for routines, data structures, and object classes. The API 1212 may be either computer-language independent or dependent and refer to a complete interface, a single function, or even a set of APIs. The service layer 1213 provides software services to the computer 1202 or other components (whether or not illustrated) that are communicably coupled to the computer 1202. The functionality of the computer 1202 may be accessible for all service consumers using this service layer. Software services, such as those provided by the service layer 1213, provide reusable, defined functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 or the service layer 1213 as stand-alone components in relation to other components of the computer 1202 or other components (whether or not illustrated) that are communicably coupled to the computer 1202. Moreover, any or all parts of the API 1212 or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202. The interface 1204 is used by the computer 1202 for communicating with other systems in a distributed environment that are connected to the network 1230 (whether illustrated or not). Generally, the interface 1204 comprises logic encoded in software or hardware (or a combination of software and hardware) and operable to communicate with the network 1230. More specifically, the interface 1204 may comprise software supporting one or more communication protocols associated with communications such that the network 1230 or interface's hardware is operable to communicate physical signals within and outside of the illustrated computer 1202.

The computer 1202 includes a processor 1205. Although illustrated as a single processor 1205 in FIG. 12, two or more processors may be used according to particular needs, desires, or particular implementations of the computer 1202. Generally, the processor 1205 executes instructions and manipulates data to perform the operations of the computer 1202 and any algorithms, methods, functions, processes, flows, and procedures as described in the instant disclosure.

The computer 1202 also includes a database 1206 that can hold data for the computer 1202 or other components (or a combination of both) that can be connected to the network 1230 (whether illustrated or not). For example, database 1206 can be an in-memory, conventional, or other type of database storing data consistent with this disclosure. In some implementations, database 1206 can be a combination of two or more different database types (for example, a hybrid in-memory and conventional database) according to particular needs, desires, or particular implementations of the computer 1202 and the described functionality. Although illustrated as a single database 1206 in FIG. 12, two or more databases (of the same or combination of types) can be used according to particular needs, desires, or particular implementations of the computer 1202 and the described functionality. While database 1206 is illustrated as an integral component of the computer 1202, in alternative implementations, database 1206 can be external to the computer 1202.

The computer 1202 also includes a memory 1207 that can hold data for the computer 1202 or other components (or a combination of both) that can be connected to the network 1230 (whether illustrated or not). For example, memory 1207 can be random access memory (RAM), read-only memory (ROM), optical, magnetic, and the like storing data consistent with this disclosure. In some implementations, memory 1207 can be a combination of two or more different types of memory (for example, a combination of RAM and magnetic storage) according to particular needs, desires, or particular implementations of the computer 1202 and the described functionality. Although illustrated as a single memory 1207 in FIG. 12, two or more memories 1207 (of the same or combination of types) can be used according to particular needs, desires, or particular implementations of the computer 1202 and the described functionality. While memory 1207 is illustrated as an integral component of the computer 1202, in alternative implementations, memory 1207 can be external to the computer 1202.

The application 1208 is an algorithmic software engine providing functionality according to particular needs, desires, or particular implementations of the computer 1202, particularly with respect to functionality described in this disclosure. For example, application 1208 can serve as one or more components, modules, applications, etc. Further, although illustrated as a single application 1208, the application 1208 may be implemented as multiple applications 1208 on the computer 1202. In addition, although illustrated as integral to the computer 1202, in alternative implementations, the application 1208 can be external to the computer 1202.

There may be any number of computers 1202 associated with, or external to, a computer system containing computer 1202, each computer 1202 communicating over network 1230. Further, the term "client," "user," and other appropriate terminology may be used interchangeably as appropriate without departing from the scope of this disclosure. Moreover, this disclosure contemplates that many users may use one computer 1202, or that one user may use multiple computers 1202.

Described implementations of the subject matter can include one or more features, alone or in combination.

For example, in a first implementation, a method is provided for generating suggestions for extensions to data sets. Using metadata for a plurality of documents, data relationships are determined between sets of documents of the plurality of documents. Each set of documents originates from different data sources and does not share common ontologies. The metadata includes terms and labels for documents in the plurality of documents. Using the determined data relationships, enhancement suggestions are determined. Each enhancement suggestion identifies pieces of information from at least one first document in the set of documents that can serve as an extension to information contained in a second document in the set of documents. The identified enhancement suggestions are ranked based on enhancement usability ranking factors. The ranked enhancement suggestions are provided.

The foregoing and other described implementations can each optionally include one or more of the following features:

A first feature, combinable with any of the following features, the common ontologies are selected from a group comprising ontologies for structured data sources, relational tables, and multi-dimensional cubes in a database.

A second feature, combinable with any of the previous or following features, the determined data relationships include a common column or field that is shared between the at least one first document and the second document.

A third feature, combinable with any of the previous or following features, ranking the identified enhancement suggestions based on the enhancement usability ranking factors includes determining an overall rank for each of the identified enhancement suggestions, the overall rank being a function of: a semantic ranking based on an analysis of semantic labels identified for the data relationships between sets of documents on which a given enhancement suggestion is based; a matching coefficient based on an analysis of how well instances of two topics match; and a usage coefficient based on previous use, by the user, of the enhancement suggestion.

A fourth feature, combinable with any of the previous or following features, the method further comprises: receiving, from a user through a user interface, a selection of a particular enhancement from the ranked enhancement suggestions; and creating, using the particular enhancement, a new document.

A fifth feature, combinable with any of the previous or following features, the method further comprises: extracting the metadata, including the terms and labels, from the plurality of documents; storing, in the information model, the metadata, relationships between documents, semantic information about the documents, and enhancement suggestions; and using the information model for identifying the enhancement suggestions and for ranking the identified enhancement suggestions.

A sixth feature, combinable with any of the previous or following features, extracting the metadata includes: crawling, using metadata crawlers, the plurality of documents to identify the metadata; and sampling, using samplers, the plurality of documents to further identify the metadata.

In a second implementation, a non-transitory, computer-readable medium storing one or more instructions executable by a computer system to perform operations comprising: determining, using metadata for a plurality of documents, data relationships between sets of documents of the plurality of documents, each set of documents originating from different data sources and not sharing common ontologies, the metadata including terms and labels for documents in the plurality of documents; identifying, using the determined data relationships, enhancement suggestions, each enhancement suggestion identifying pieces of information from at least one first document in the set of documents that can serve as an extension to information contained in a second document in the set of documents; ranking the identified enhancement suggestions based on enhancement usability ranking factors; and providing the ranked enhancement suggestions.

The foregoing and other described implementations can each optionally include one or more of the following features:

A first feature, combinable with any of the following features, the common ontologies are selected from a group comprising ontologies for structured data sources, relational tables, and multi-dimensional cubes in a database.

A second feature, combinable with any of the previous or following features, the determined data relationships include a common column or field that is shared between the at least one first document and the second document.

A third feature, combinable with any of the previous or following features, ranking the identified enhancement suggestions based on the enhancement usability ranking factors includes determining an overall rank for each of the identified enhancement suggestions, the overall rank being a function of: a semantic ranking based on an analysis of semantic labels identified for the data relationships between sets of documents on which a given enhancement suggestion is based; a matching coefficient based on an analysis of how well instances of two topics match; and a usage coefficient based on previous use, by the user, of the enhancement suggestion.

A fourth feature, combinable with any of the previous or following features, the operations further comprise: receiving, from a user through a user interface, a selection of a particular enhancement from the ranked enhancement suggestions; and creating, using the particular enhancement, a new document.

A fifth feature, combinable with any of the previous or following features, the operations further comprise: extracting the metadata, including the terms and labels, from the plurality of documents; storing, in the information model, the metadata, relationships between documents, semantic information about the documents, and enhancement suggestions; and using the information model for identifying the enhancement suggestions and for ranking the identified enhancement suggestions.

A sixth feature, combinable with any of the previous or following features, extracting the metadata includes: crawling, using metadata crawlers, the plurality of documents to identify the metadata; and sampling, using samplers, the plurality of documents to further identify the metadata.

In a third implementation, a computer-implemented system comprises: a computer memory; and a hardware processor interoperably coupled with the computer memory and configured to perform operations comprising: determining, using metadata for a plurality of documents, data relationships between sets of documents of the plurality of documents, each set of documents originating from different data sources and not sharing common ontologies, the metadata including terms and labels for documents in the plurality of documents; identifying, using the determined data relationships, enhancement suggestions, each enhancement suggestion identifying pieces of information from at least one first document in the set of documents that can serve as an extension to information contained in a second document in the set of documents; ranking the identified enhancement suggestions based on enhancement usability ranking factors; and providing the ranked enhancement suggestions.

The foregoing and other described implementations can each optionally include one or more of the following features:

A first feature, combinable with any of the following features, the common ontologies are selected from a group comprising ontologies for structured data sources, relational tables, and multi-dimensional cubes in a database.

A second feature, combinable with any of the previous or following features, the determined data relationships include a common column or field that is shared between the at least one first document and the second document.

A third feature, combinable with any of the previous or following features, ranking the identified enhancement suggestions based on the enhancement usability ranking factors includes determining an overall rank for each of the identified enhancement suggestions, the overall rank being a function of: a semantic ranking based on an analysis of semantic labels identified for the data relationships between sets of documents on which a given enhancement suggestion is based; a matching coefficient based on an analysis of how well instances of two topics match; and a usage coefficient based on previous use, by the user, of the enhancement suggestion.

A fourth feature, combinable with any of the previous or following features, the operations further comprise: receiving, from a user through a user interface, a selection of a particular enhancement from the ranked enhancement suggestions; and creating, using the particular enhancement, a new document.

A fifth feature, combinable with any of the previous or following features, the operations further comprise: extracting the metadata, including the terms and labels, from the plurality of documents; storing, in the information model, the metadata, relationships between documents, semantic information about the documents, and enhancement suggestions; and using the information model for identifying the enhancement suggestions and for ranking the identified enhancement suggestions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or in addition to, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    identifying a plurality of documents for which data relationships are to be determined between sets of documents of the plurality of documents and for which enhancement suggestions are be provided;
    determining, using metadata for the plurality of documents, the data relationships between the sets of documents of the plurality of documents, each set of documents originating from different data sources and not sharing common ontologies, the metadata including terms and labels for documents in the plurality of documents, wherein a set of different terms from different documents are related to a common topic representing a cluster of the set of different terms;

identifying, using the data relationships, enhancement suggestions, each enhancement suggestion identifying pieces of information from at least one first document in the set of documents that can serve as an extension to information contained in a second document in the set of documents, wherein each enhancement suggestion identifies one or more columns from the at least one first document in the set of documents to add, physically, as new columns in the second document to create a new document that is an extension of the second document and physically includes the new columns, wherein the enhancement suggestions include adding a new column representing the common topic;

ranking, based on enhancement usability ranking factors, the enhancement suggestions as ranked enhancement suggestions;

automatically extending the second document based on one or more of the ranked enhancement suggestions, wherein the extension of the second document includes physically adding, to the second document, columns associated with the one or more of the ranked enhancement suggestions, the columns including: 1) a first column representing the common topic, and 2) a second column representing a relatedness coefficient in a range 0.0 to 1.0 indicating how tightly a given one of the different terms matches the common topic, wherein the relatedness coefficient is calculated from a combination of a sematic ranking, a matching coefficient, and a usage coefficient; and storing the first column and the second column in the second document.

2. The computer-implemented method of claim 1, wherein the common ontologies are selected from a group comprising ontologies for structured data sources, relational tables, and multi-dimensional cubes in a database.

3. The computer-implemented method of claim 1, wherein the data relationships include a common column or field that is shared between the at least one first document and the second document.

4. The computer-implemented method of claim 1, wherein ranking the enhancement suggestions based on the enhancement usability ranking factors includes determining an overall rank for each of the enhancement suggestions, the overall rank being a function of:
 a semantic ranking based on an analysis of semantic labels identified for the data relationships between sets of documents on which a given enhancement suggestion is based;
 a matching coefficient based on an analysis of how well instances of two topics match; and
 a usage coefficient based on previous use, by a user, of the enhancement suggestion.

5. The computer-implemented method of claim 1, further comprising:
 receiving, from a user through a user interface, a selection of a particular enhancement from the ranked enhancement suggestions; and
 creating, using the particular enhancement, a new document.

6. The computer-implemented method of claim 1, further comprising:
 extracting the metadata, including the terms and labels, from the plurality of documents;
 storing, in an information model, the metadata, relationships between documents, semantic information about the documents, and enhancement suggestions; and using the information model for identifying the enhancement suggestions and for ranking the enhancement suggestions.

7. The computer-implemented method of claim 6, wherein extracting the metadata includes:
 crawling, using metadata crawlers, the plurality of documents to identify the metadata; and
 sampling, using samplers, the plurality of documents to further identify the metadata.

8. A non-transitory, computer-readable medium storing one or more instructions executable by a computer system to perform operations comprising:
 identifying a plurality of documents for which data relationships are to be determined between sets of documents of the plurality of documents and for which enhancement suggestions are be provided;
 determining, using metadata for the plurality of documents, the data relationships between the sets of documents of the plurality of documents, each set of documents originating from different data sources and not sharing common ontologies, the metadata including terms and labels for documents in the plurality of documents, wherein a set of different terms from different documents are related to a common topic representing a cluster of the set of different terms;
 identifying, using the determined data relationships, enhancement suggestions, each enhancement suggestion identifying pieces of information from at least one first document in the set of documents that can serve as an extension to information contained in a second document in the set of documents, wherein each enhancement suggestion identifies one or more columns from the at least one first document in the set of documents to add, physically, as new columns in the second document to create a new document that is an extension of the second document and physically includes the new columns, wherein the enhancement suggestions include adding a new column representing the common topic;
 ranking, based on enhancement usability ranking factors, the enhancement suggestions as ranked enhancement suggestions;
 automatically extending the second document based on one or more of the ranked enhancement suggestions, wherein the extension of the second document includes physically adding, to the second document, columns associated with the one or more of the ranked enhancement suggestions, the columns including: 1) a first column representing the common topic, and 2) a second column representing a relatedness coefficient in a range 0.0 to 1.0 indicating how tightly a given one of the different terms matches the common topic, wherein the relatedness coefficient is calculated from a combination of a sematic ranking, a matching coefficient, and a usage coefficient; and
 storing the first column and the second column in the second document.

9. The non-transitory, computer-readable medium of claim 8, wherein the common ontologies are selected from a group comprising ontologies for structured data sources, relational tables, and multi-dimensional cubes in a database.

10. The non-transitory, computer-readable medium of claim 8, wherein the data relationships include a common column or field that is shared between the at least one first document and the second document.

11. The non-transitory, computer-readable medium of claim 8, wherein ranking the enhancement suggestions based on the enhancement usability ranking factors includes determining an overall rank for each of the enhancement suggestions, the overall rank being a function of:
- a semantic ranking based on an analysis of semantic labels identified for the data relationships between sets of documents on which a given enhancement suggestion is based;
- a matching coefficient based on an analysis of how well instances of two topics match; and
- a usage coefficient based on previous use, by a user, of the enhancement suggestion.

12. The non-transitory, computer-readable medium of claim 8, the operations further comprising:
- receiving, from a user through a user interface, a selection of a particular enhancement from the ranked enhancement suggestions; and
- creating, using the particular enhancement, a new document.

13. The non-transitory, computer-readable medium of claim 8, the operations further comprising:
- extracting the metadata, including the terms and labels, from the plurality of documents;
- storing, in an information model, the metadata, relationships between documents, semantic information about the documents, and enhancement suggestions; and
- using the information model for identifying the enhancement suggestions and for ranking the enhancement suggestions.

14. The non-transitory, computer-readable medium of claim 13, wherein extracting the metadata includes:
- crawling, using metadata crawlers, the plurality of documents to identify the metadata; and
- sampling, using samplers, the plurality of documents to further identify the metadata.

15. A computer-implemented system, comprising:
- a computer memory; and
- a hardware processor interoperably coupled with the computer memory and configured to perform operations comprising:
  - identifying a plurality of documents for which data relationships are to be determined between sets of documents of the plurality of documents and for which enhancement suggestions are be provided;
  - determining, using metadata for the plurality of documents, the data relationships between the sets of documents of the plurality of documents, each set of documents originating from different data sources and not sharing common ontologies, the metadata including terms and labels for documents in the plurality of documents, wherein a set of different terms from different documents are related to a common topic representing a cluster of the set of different terms;
  - identifying, using the determined data relationships, enhancement suggestions, each enhancement suggestion identifying pieces of information from at least one first document in the set of documents that can serve as an extension to information contained in a second document in the set of documents, wherein each enhancement suggestion identifies one or more columns from the at least one first document in the set of documents to add, physically, as new columns in the second document to create a new document that is an extension of the second document and physically includes the new columns, wherein the enhancement suggestions include adding a new column representing the common topic;
  - ranking, based on enhancement usability ranking factors, the enhancement suggestions as ranked enhancement suggestions;
  - automatically extending the second document based on one or more of the ranked enhancement suggestions, wherein the extension of the second document includes physically adding, to the second document, columns associated with the one or more of the ranked enhancement suggestions, the columns including: 1) a first column representing the common topic, and 2) a second column representing a relatedness coefficient in a range 0.0 to 1.0 indicating how tightly a given one of the different terms matches the common topic, wherein the relatedness coefficient is calculated from a combination of a sematic ranking, a matching coefficient, and a usage coefficient; and
  - storing the first column and the second column in the second document.

16. The computer-implemented system of claim 15, wherein the common ontologies are selected from a group comprising ontologies for structured data sources, relational tables, and multi-dimensional cubes in a database.

17. The computer-implemented system of claim 15, wherein the data relationships include a common column or field that is shared between the at least one first document and the second document.

18. The computer-implemented system of claim 15, wherein ranking the enhancement suggestions based on the enhancement usability ranking factors includes determining an overall rank for each of the enhancement suggestions, the overall rank being a function of:
- a semantic ranking based on an analysis of semantic labels identified for the data relationships between sets of documents on which a given enhancement suggestion is based;
- a matching coefficient based on an analysis of how well instances of two topics match; and
- a usage coefficient based on previous use, by a user, of the enhancement suggestion.

19. The computer-implemented system of claim 15, the operations further comprising:
- receiving, from a user through a user interface, a selection of a particular enhancement from the ranked enhancement suggestions; and
- creating, using the particular enhancement, a new document.

20. The computer-implemented system of claim 15, the operations further comprising:
- extracting the metadata, including the terms and labels, from the plurality of documents;
- storing, in an information model, the metadata, relationships between documents, semantic information about the documents, and enhancement suggestions; and
- using the information model for identifying the enhancement suggestions and for ranking the enhancement suggestions.

* * * * *